United States Patent
Huttunen

(10) Patent No.: US 7,529,374 B2
(45) Date of Patent: May 5, 2009

(54) METHOD AND APPARATUS FOR ENCRYPTING DATA

(75) Inventor: Ari Huttunen, Helsinki (FI)

(73) Assignee: F-Secure Oyj, Helsinki (FI)

( * ) Notice: Subject to any disclaimer, the term of this patent is extended or adjusted under 35 U.S.C. 154(b) by 921 days.

(21) Appl. No.: 10/356,527

(22) Filed: Feb. 3, 2003

(65) Prior Publication Data

US 2003/0147267 A1 Aug. 7, 2003

(30) Foreign Application Priority Data

Feb. 2, 2002 (GB) ................... 0202431.3

(51) Int. Cl.
  *H04L 9/00* (2006.01)
  *G06F 11/30* (2006.01)
(52) U.S. Cl. .................. 380/277; 713/193; 713/171
(58) Field of Classification Search ........... 713/193, 713/171; 380/277
See application file for complete search history.

(56) References Cited

U.S. PATENT DOCUMENTS

| | | | | |
|---|---|---|---|---|
| 4,160,120 A | * | 7/1979 | Barnes et al. ............ | 380/29 |
| 5,592,556 A | * | 1/1997 | Schwed .................... | 380/274 |
| 5,604,801 A | * | 2/1997 | Dolan et al. .............. | 713/159 |
| 5,737,416 A | * | 4/1998 | Cooper et al. ............ | 705/52 |
| 5,870,477 A | * | 2/1999 | Sasaki et al. ............. | 713/165 |
| 6,223,285 B1 | * | 4/2001 | Komuro et al. ........... | 713/160 |
| 6,424,718 B1 | * | 7/2002 | Holloway .................. | 380/277 |
| 6,549,626 B1 | * | 4/2003 | Al-Salqan ................. | 380/286 |
| 6,694,025 B1 | * | 2/2004 | Epstein et al. ........... | 380/279 |
| 7,177,427 B1 | * | 2/2007 | Komuro et al. ........... | 380/239 |
| 7,225,331 B1 | * | 5/2007 | McBrearty et al. ....... | 713/158 |
| 2001/0033012 A1 | * | 10/2001 | Kommerling et al. ..... | 257/679 |
| 2002/0124176 A1 | * | 9/2002 | Epstein ..................... | 713/186 |
| 2002/0152393 A1 | * | 10/2002 | Thoma et al. ............. | 713/189 |

FOREIGN PATENT DOCUMENTS

| | | |
|---|---|---|
| GB | 2 328 047 A | 2/1999 |
| GB | 2 367 933 A | 4/2002 |
| JP | 5-113932 | 5/1993 |
| WO | WO 00/74297 A3 | 12/2000 |

* cited by examiner

*Primary Examiner*—Emmanuel L Moise
*Assistant Examiner*—Techane J Gergiso
(74) *Attorney, Agent, or Firm*—Squire, Sanders & Dempsey, LLP

(57) ABSTRACT

A method of securing data on an electronic device comprises allowing a user of the device to select one of an encryption and decryption operating mode and an encryption only operating mode. The encryption and decryption operating mode requires that the device have access to a user passphrase, and the encryption only operating mode does not require that the device have access to the passphrase.

14 Claims, 2 Drawing Sheets

METHOD AND APPARATUS FOR ENCRYPTING DATA

FIELD OF THE INVENTION

The present invention relates to a method and apparatus for encrypting data and in particular, though not necessarily, to a method and apparatus for encrypting data stored on a portable device.

BACKGROUND OF THE INVENTION

The use of portable electronic devices capable of storing data has greatly increased in recent times. Examples of such portable devices are laptop computers, personal digital assistants (PDAs), mobile telephones, and hybrid devices combining the functionality of PDAs and mobile telephones. Users often need to store valuable confidential information on their devices and, in order to prevent third parties from accessing such data, the data may be encrypted using a suitable encryption application running on the device. Example applications are the File Crypto set of products available from F-Secure®, Helsinki Finland.

An encryption application for use on a portable device typically makes use of a so-called symmetric cipher. A symmetric cipher encrypts data by applying a key to the data using an encryption function. The data can be decrypted by applying the same key to the data using an inverse encryption function. Typically, for each new file or folder to be encrypted a specific symmetric key is generated. These folder keys are then encrypted with a master key generated by the user when installing the encryption application. When not in use, the master key is encrypted with a passphrase (known to the authorised user) and stored in a memory of the device. When encryption and decryption is required, the master key must be available to the encryption application in unencrypted form. Typically, when a user turns on a portable device, he or she is prompted to enter the passphrase, and the master key is decrypted and stored in memory where it remains until the device is switched off.

SUMMARY OF THE INVENTION

Due to their very nature, portable devices are prone to loss and theft. Indeed, it is possible that a device may be lost or stolen while it is in use. This represents a serious security risk as in this state the encryption key will be saved on the device in unencrypted form and the thief or person finding the device will be able to access all data on the device.

It is an object of the present invention to reduce the risks associated with storing valuable data on portable electronic devices.

According to a first aspect of the present invention there is a method of securing data on an electronic device and comprising:

allowing a user of the device to select one of an encryption and decryption operating mode and an encryption only operating mode, wherein, the encryption and decryption operating mode requires that the device have access to a user passphrase, and the encryption only operating mode does not require that the device have access to the passphrase.

Embodiments of the present invention allow portable devices to be operated in two distinct modes; an encryption only mode and an encryption and decryption mode. In the former mode, the user does not enter his or her passphrase into the device. The symmetric key and the private key of the public-private key pair remain encrypted. Data is encrypted using the public key or another key secured using the public key, and cannot be decrypted whilst the device is operating in this mode. In the encryption and decryption mode, the user enters the passphrase into the device. The symmetric and private keys are decrypted, and previously encrypted data can be decrypted and accessed. In this mode, data may also be encrypted. Encryption is carried out using the said symmetric key or alternatively using a further temporary symmetric key which is generated for each encryption operation (or for each series of operations) and which is subsequently secured using the first mentioned symmetric key.

According to a second aspect of the present invention there is provided a method of securing data stored on an electronic device whereby access to the secured data requires the entry of a user passphrase, the method comprising:

encrypting the data using a symmetric cipher and a corresponding symmetric key ($KEY_{tmp}$) which is accessible without the need for the passphrase, storing the encrypted data and destroying the unencrypted data; and destroying the plaintext form of the symmetric key, whilst storing the symmetric key ($KEY_{tmp}$) in an encrypted form protected by said passphrase so that, immediately following the encryption of the data, the unencrypted key ($KEY_{tmp}$) is unavailable to the device until the passphrase is subsequently available to the device.

It will be appreciated that the term "passphrase" as used here encompasses PIN numbers, passwords, phrases or other collections of words, graphical and biometric passwords, and other suitable alternatives.

Whilst a principal application of the invention is in portable electronic devices, the invention may also be applied to non-portable devices, for example computer workstations.

In certain embodiments of the invention, data encrypted in said first mode is automatically decrypted when the device is subsequently operated in said second mode, and is re-encrypted using the symmetric key.

Preferably said symmetric key ($KEY_{tmp}$) is selected from a set of symmetric keys stored in a memory of the device.

Preferably, said set of symmetric keys is stored in plaintext form in a memory of the device, together with encrypted versions of the same keys protected using said passphrase.

In an embodiment of the invention, said symmetric key ($KEY_{tmp}$) is dynamically generated when it is required to encrypt data.

In an embodiment of the invention, the symmetric key ($KEY_{tmp}$) is protected by encrypting the key with the public key ($KEY_{pub}$) of a public/private key pair. More preferably, the private key ($KEY_{priv}$) of the public/private key pair is protected with a second symmetric key ($KEY_{sym}$), the second symmetric key being encrypted with said passphrase or being derivable therefrom. Alternatively, the private key ($KEY_{priv}$) of the public/private key pair is encrypting with said passphrase.

In an embodiment, the symmetric key ($KEY_{tmp}$) is protected with a second symmetric key ($KEY_{sym}$), the second symmetric key being encrypted with said passphrase or being derivable therefrom.

Preferably, in the method of the first aspect of the invention, said encryption only mode uses the method of the second aspect of the invention. Said encryption and decryption mode encrypts data may use a symmetric key ($KEY_{tmp}$), that symmetric key being encrypted with said second symmetric key ($KEY_{sym}$).

Typically, said electronic device is a portable electronic device.

According to a third aspect of the present invention there is provided an electronic device comprising hardware and/or software for causing the device to operate in one of two operating modes, an encryption and decryption operating mode and an encryption only operating mode, the encryption and decryption operating mode requiring that the device have access to a user passphrase, and the encryption only operating mode does not require that the device have access to the passphrase.

Preferably, the hardware and/or software also stores a public/private key pair and a symmetric key ($KEY_{sym}$) or provides means for generating a symmetric key ($KEY_{sym}$) in a memory of the device, the private key ($KEY_{priv}$) of said pair being encrypted with the symmetric key ($KEY_{sym}$), and the symmetric key ($KEY_{sym}$) being encrypted with a passphrase or generated from a passphrase using said means, wherein in said encryption only operating mode, encrypting data using a key, that key being either the public key ($KEY_{pub}$) or a temporary key ($KEY_{tmp}$) which is secured using the public key when not in use;

in said encryption and decryption operating mode, encrypting data using a temporary key ($KEY_{tmp}$) and encrypting the temporary key ($KEY_{tmp}$) using a symmetric key ($KEY_{sym}$) which is secured using said passphrase;

wherein, in said encryption and decryption operating mode, access to the passphrase enables data encrypted in both modes to be decrypted.

According to a fourth aspect of the present invention there is provided a computer program storage medium having stored thereon a computer program for causing a computer device to:

allow a user of the device to select one of an encryption and decryption operating mode and an encryption only operating mode, wherein, the encryption and decryption operating mode requires that the device have access to a user passphrase, and the encryption only operating mode does not require that the device have access to the passphrase.

According to a fifth aspect of the present invention there is provided an a method of securing data stored on an electronic device, the method comprising:

1) pre-generating a plurality of symmetric keys for use with a symmetric cipher;
2) storing the keys in a memory of the device in a plaintext form and in an encrypted form, the encrypted form being protected by a user passphrase;
3) encrypting a block of data using one of said symmetric keys;
4) storing the encrypted block and destroying the plaintext version;
5) destroying the plaintext version of the key used to encrypt the block; and
6) repeating steps 3) to 5) for each subsequent block to be encrypted, wherein the encrypted blocks are secured until such time as a user enters the passphrase to unlock the encrypted versions of the used symmetric keys.

DETAILED DESCRIPTION OF CERTAIN EMBODIMENTS

Figure 1:
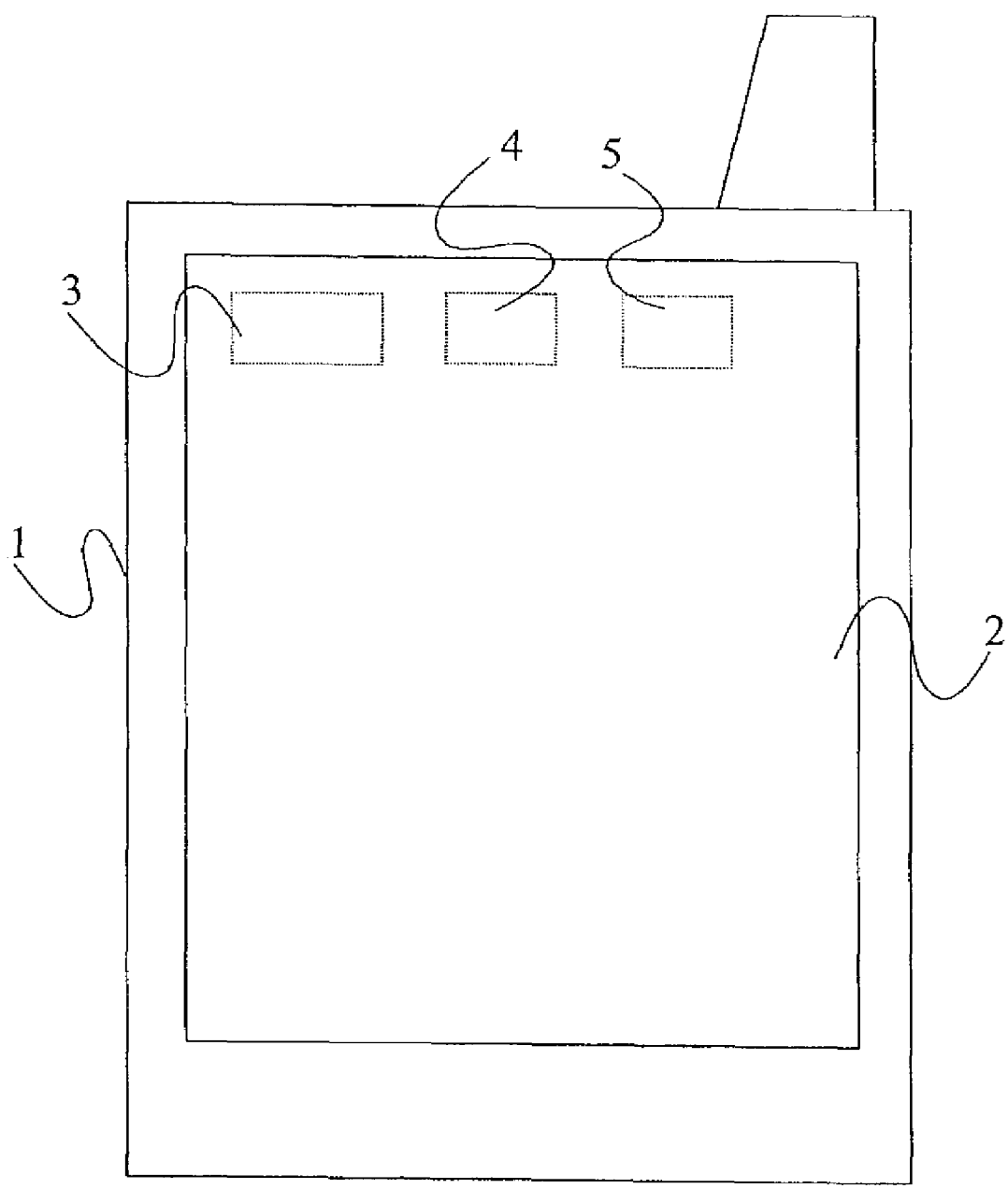
FIG. 1 illustrates schematically a personal digital assistant device.
Figure 2:
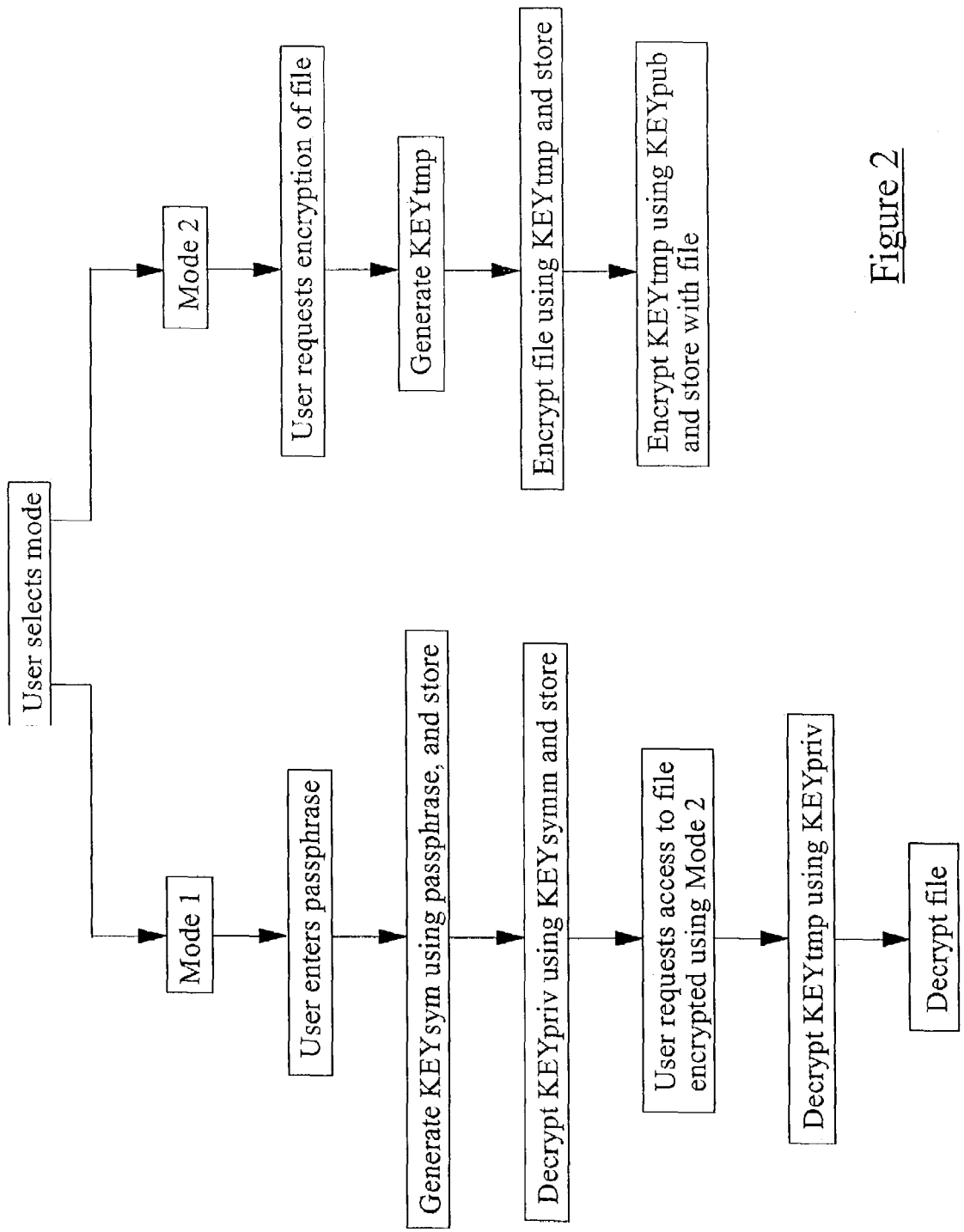
FIG. 2 is a flow diagram illustrating a method of securing data in the personal digital assistant device of FIG. 1.

There is illustrated in FIG. 1 a mobile computing device 1 which, in this example, is a personal digital assistant (PDA). The PDA has a large display screen 2 which is touch sensitive to provide a mechanism for entering data into the device. The PDA 1 may include mobile (cellular) telephone functionality, e.g. GSM or third generation (e.g. 3G). The PDA 1 comprises a microprocessor 3, a ROM memory 4, and a RAM memory 5.

The RAM 5 is arranged to store both program files and user data. Stored in the RAM 5 (or possibly the ROM 4) is program code for encrypting and decrypting data, typically user data files such as text files, images, contacts, spreadsheets, etc, and which is run by the microprocessor 3. The program has two modes of operation, a first encryption and decryption mode and a second encryption only mode. The user is asked to select one of these modes when the device is first turned on. The user may also toggle between the two modes when the device is in use. In either event, when the user wishes to use the first mode, he or she is asked to enter a passphrase. This passphrase is not required when the user selects the second mode.

In the first mode, the program makes use a symmetric cipher such as DES, Triple DES, or AES, and makes use of a cryptographic key $KEY_{sym}$ that is generated by a (pseudo) random number generator and protected using a passphrase supplied by the user, for example with the method described in PKCS#5 (RSA™ Technologies). The passphrase is first selected by the user when the encryption application is installed into the device (or when it is first activated if the encryption application is pre-installed into the PDA 1). When the device is not being operated in the first mode or is switched off, the cryptographic key $KEY_{sym}$ is stored in the RAM 5, encrypted with the passphrase. When the device is switched on and operated in the first mode, the key is stored in the RAM 5 in plaintext and is freely available to the encryption program.

When a user requests encryption of a file (or some application requests encryption) the program generates a temporary key $KEY_{tmp}$ (again using a random number generator) which is used by the symmetric cipher to encrypt the file. A new temporary key $KEY_{tmp}$ is generated for each file or folder to be encrypted. The encrypted file is stored in the RAM 5 and the unencrypted version erased. The temporary key is encrypted using the symmetric key $KEY_{sym}$, and is stored in the RAM 5. The plaintext version of the temporary key is deleted. In this first operating mode, files previously encrypted with the symmetric cipher can be decrypted as the symmetric key $KEY_{sym}$ is freely available and therefore the temporary keys can be decrypted and made available.

If the user selects the encryption only mode, the key $KEY_{sym}$ associated with the symmetric cipher is encrypted and unavailable. In this mode, when the user requests encryption of a file, the program generates a temporary key $KEY_{tmp}$ for use with the symmetric cipher using the pseudo random number generator. The file is encrypted with the temporary key $KEY_{tmp}$ and the symmetric cipher. The encrypted file is stored and the original erased. The temporary key $KEY_{tmp}$ is then immediately encrypted with the public key $KEY_{pub}$ of a public-private key pair belonging to the user, and the encrypted temporary key $KEY_{tmp}$ is stored in the RAM 5 together with the encrypted file. The or each plaintext copy of the temporary key is destroyed. The encryption uses an asymmetric cipher (e.g RSA™) such that the private key $KEY_{priv}$ is required to decrypt the temporary key $KEY_{tmp}$. For each file encrypted in the second mode, a different temporary key will be generated.

The key pair is typically generated when the encryption application is installed into the device or when the application is subsequently activated for the first time. The public key $KEY_{pub}$ of the key pair is stored in the RAM 5 and is freely available to the encryption application. The private key $KEY_{priv}$ on the other hand is encrypted using the symmetric key $KEY_{sym}$ before being stored in the RAM 5.

It will be appreciated that in the second operating mode, the private key is not available to the encryption application, and consequentially it is not possible for the application to obtain the temporary symmetric keys $KEY_{tmp}$ to decrypt the encrypted files. User access of encrypted files (including those encrypted with the temporary key $KEY_{tmp}$ and with the symmetric keys $KEY_{sym}$) is prevented.

In order to access encrypted data, the user must enter the first operating mode. As described above, in this mode the symmetric key $KEY_{sym}$ is available and can be used to decrypt files encrypted with that key. In addition, the $KEY_{sym}$ can be used to decrypt the private key $KEY_{priv}$ which in turn is used to decrypt the various temporary keys $KEY_{tmp}$. Typically, the symmetric key $KEY_{sym}$ is generated upon power-up or when the user toggles from the second to the first mode, and is stored in the RAM 5. At this time, the symmetric key is also used to decrypt the private key $KEY_{priv}$ stored in the ROM 4. The decrypted copy of the private key is stored in the RAM 5. Both of these keys, i.e. the decrypted private and symmetric keys, will be erased from the RAM 5 when the device is turned off or when the user toggles from the first to the second mode (the keys may also be erased after some predefined period of non-use, e.g. 5 minutes, after which the user is prompted to re-enter the passphrase to restart mode 1). A temporary key $KEY_{tmp}$ is generated only when a user requests access to a corresponding encrypted file.

An alternative mechanism for securing data on a portable device will now be described. This alternative mechanism is based purely on symmetric cryptography and does not require the use of a public/private key pair. Whilst the master key, i.e. the symmetric key $KEY_{sym}$, is in memory as plaintext, the file crypto application generates a set of temporary keys $KEY_{tmp}$, and makes two copies of each key. One of the copies is stored in permanent storage in plaintext format and the other is stored encrypted using the master key $KEY_{sym}$.

When the passphrase protecting the master key is unavailable, the plaintext versions of the temporary keys can be used to encrypt respective data files/folders. Following the encryption of a file/folder, the plaintext version of the used temporary key is destroyed. The file can only be decrypted following entry of the passphrase and the decryption of the required temporary key with the master key. In order to improve security, the list of pre-generated keys may be replaced periodically with a new list, even though all of the old keys have note been used. This reduces the risk of somebody copying the keys for future unauthorised use.

It will be appreciated by the person of skill in the art that various modifications may be made to the above described embodiments without departing from the scope of the present invention.

The invention claimed is:

1. A method of securing data stored on an electronic device whereby access to the secured data requires entry of a user passphrase, the method comprising:
   encrypting the data using a symmetric cipher and a corresponding symmetric key ($KEY_{tmp}$) which is accessible without the need for the user passphrase, storing the encrypted data and destroying the unencrypted data;
   protecting the symmetric key (KEYtmp) by encrypting the symmetric key ($KEY_{tmp}$) with the public key ($KEY_{pub}$) of a public/private key pair;
   destroying a plaintext form of the symmetric key ($KEY_{tmp}$), whilst storing the encrypted symmetric key ($KEY_{tmp}$); and
   protecting the private key ($KEY_{priv}$) of the public/private key pair with a second symmetric key ($KEY_{sym}$), the second symmetric key ($KEY_{tmp}$) being encrypted with said user passphrase or with a key being derivable therefromderived from said user passphrase,
   wherein immediately following the encryption of the data, the unencrypted key ($KEY_{tmp}$) is unavailable to the device until the user passphrase is subsequently available to the device.

2. A method according to claim 1 and comprising selecting said symmetric key ($KEY_{tmp}$) from a set of symmetric keys stored in a memory of the device.

3. A method according to claim 2 and comprising storing said set of symmetric keys in plaintext form in a memory of the device, together with encrypted versions of the same keys protected using said user passphrase.

4. A method according to claim 1 and comprising dynamically generating said symmetric key ($KEY_{tmp}$) when it is required to encrypt data.

5. A method of securing data stored on an electronic device whereby access to the secured data requires entry of a user passphrase, the method comprising:
   encrypting the data using a symmetric cipher and a corresponding symmetric key ($KEY_{tmp}$) which is accessible without the need for the user passphrase, storing the encrypted data and destroying the unencrypted data;
   protecting the symmetric key ($KEY_{tmp}$) by encrypting the symmetric key with the public key ($KEY_{pub}$) of a public/private key pair;
   destroying a plaintext form of the symmetric key, whilst storing the encrypted symmetric key ($KEY_{tmp}$); and
   protecting the private key ($KEY_{priv}$) of the public/private key pair by encrypting it with said user passphrase,
   wherein immediately following the encryption of the data, the unencrypted symmetric key ($KEY_{tmp}$) is unavailable to the device until the user passphrase is subsequently available to the device.

6. A method according to claim 5 and comprising selecting said symmetric key ($KEY_{tmp}$) from a set of symmetric keys stored in a memory of the device.

7. A method according to claim 6 and comprising storing said set of symmetric keys in plaintext form in a memory of the device, together with encrypted versions of the same keys protected using said user passphrase.

8. A method according to claim 5 and comprising dynamically generating said symmetric key ($KEY_{tmp}$) when it is required to encrypt data.

9. A method of securing data stored on an electronic device whereby access to the secured data requires entry of a user passphrase, the method comprising:
   encrypting the data using a symmetric cipher and a corresponding symmetric key ($KEY_{tmp}$) which is accessible without the need for the user passphrase, storing the encrypted data and destroying the unencrypted data;
   protecting the symmetric key ($KEY_{tmp}$) with a second symmetric key ($KEY_{sym}$), the second symmetric key being encrypted with said user passphrase or a key derived from said user passphrase; and
   destroying a plaintext form of the symmetric key ($KEY_{tmp}$), whilst storing the encrypted symmetric key ($KEY_{tmp}$), wherein immediately following the encryption of the data, the unencrypted symmetric key ($KEY_{tmp}$) is unavailable to the device until the user passphrase is subsequently available to the device.

10. A method according to claim 9 and comprising selecting said symmetric key ($KEY_{tmp}$) from a set of symmetric keys stored in a memory of the device.

11. A method according to claim 10 and comprising storing said set of symmetric keys in plaintext form in a memory of the device, together with encrypted versions of the same keys protected using said user passphrase.

12. A method according to claim 9 and comprising dynamically generating said symmetric key ($KEY_{tmp}$) when it is required to encrypt data.

13. A method of securing data on an electronic device and comprising:
   allowing a user of the device to select one of an encryption and decryption operating mode and an encryption only operating mode,
   wherein said encryption only mode comprises encrypting the data using a symmetric cipher and a corresponding symmetric key ($KEY_{tmp}$) which is accessible without the need for the user passphrase, storing the encrypted data, destroying the unencrypted data, and encrypting and storing the symmetric key ($KEY_{tmp}$) whilst destroying a plaintext form of the symmetric key, whilst storing the symmetric key ($KEY_{tmp}$),
   wherein said encryption and decryption mode encrypts data using a symmetric key ($KEY_{tmp}$), that symmetric key being encrypted with a second symmetric key ($KEY_{sym}$), the second symmetric key ($KEY_{tmp}$) being encrypted with said user passphrase or with a key derived from said user passphrase, and
   wherein immediately following the encryption of the data, the unencrypted key ($KEY_{tmp}$) is unavailable to the device until the passphrase is subsequently available to the device
   wherein the encryption and decryption operating mode requires that the device have access to a user passphrase, and the encryption only operating mode does not require that the device have access to the user passphrase.

14. An electronic device, comprising:
   hardware and software for causing the device to operate in one of two operating modes, an encryption and decryption operating mode and an encryption only operating mode, the encryption and decryption operating mode requiring that the device have access to a user passphrase, and the encryption only operating mode does not require that the device have access to the user passphrase,
   generating means for generating a symmetric key ($KEY_{sym}$) in a memory of the device, wherein a private key ($KEY_{priv}$) of a public/private key pair is encrypted with the symmetric key ($KEY_{sym}$), and the symmetric key ($KEY_{sym}$) is encrypted with said user passphrase or generated from said user passphrase using said generating means; and
   encryption means for
      when said device is in said encryption only operating mode, encrypting data using a temporary key ($KEY_{tmp}$), the key ($KEY_{tmp}$) is encrypted using the public key ($KEY_{pub}$) of the public/private key pair
      when said device is in said encryption and decryption operating mode, encrypting said data using a temporary key ($KEY_{tmp}$) and encrypting the temporary key ($KEY_{tmp}$) using a symmetric key ($KEY_{sym}$) which is secured using said user passphrase;
   wherein, when said device is in said encryption and decryption operating mode, access to the user passphrase enables data encrypted in both modes to be decrypted.

* * * * *